US008744048B2

(12) United States Patent  (10) Patent No.: US 8,744,048 B2
Lee et al.  (45) Date of Patent: Jun. 3, 2014

(54) INTEGRATED X-RAY SOURCE HAVING A MULTILAYER TOTAL INTERNAL REFLECTION OPTIC DEVICE

(75) Inventors: Susanne Madeline Lee, Cohoes, NY (US); Peter Michael Edic, Albany, NY (US); Forrest Frank Hopkins, Cohoes, NY (US); Alfried Haase, Ahrensburg (DE); Eberhard Neuser, Wunstorf (DE)

(73) Assignee: General Electric Company, Niskayuna, NY (US)

( * ) Notice: Subject to any disclaimer, the term of this patent is extended or adjusted under 35 U.S.C. 154(b) by 697 days.

(21) Appl. No.: 12/979,409

(22) Filed: Dec. 28, 2010

(65) Prior Publication Data
US 2012/0163547 A1 Jun. 28, 2012

(51) Int. Cl.
H01J 35/08 (2006.01)
H01J 35/18 (2006.01)
G21K 1/00 (2006.01)
G21G 4/04 (2006.01)

(52) U.S. Cl.
USPC ............ 378/143; 378/140; 378/145; 378/120

(58) Field of Classification Search
USPC .................................. 378/120, 143, 140, 145
See application file for complete search history.

(56) References Cited

U.S. PATENT DOCUMENTS

| | | |
|---|---|---|
| 4,969,175 A | 11/1990 | Nelson et al. |
| 5,192,869 A | 3/1993 | Kumakhov |
| 5,433,988 A | 7/1995 | Fukuda et al. |
| 5,528,654 A | 6/1996 | Niibe et al. |
| 5,604,353 A | 2/1997 | Gibson et al. |
| 6,160,867 A | 12/2000 | Murakami |
| 6,934,359 B2 | 8/2005 | Chen et al. |
| 7,366,374 B1 | 4/2008 | Lee et al. |
| 7,412,131 B2 | 8/2008 | Lee et al. |
| 7,508,911 B1 | 3/2009 | Lee et al. |
| 7,742,566 B2 | 6/2010 | Hopkins et al. |
| 2003/0185344 A1 | 10/2003 | Ukita |
| 2005/0041770 A1 | 2/2005 | Heismann et al. |
| 2005/0094271 A1 | 5/2005 | Hoghoj |
| 2005/0117239 A1 | 6/2005 | Hoghoj et al. |
| 2005/0205667 A1 | 9/2005 | Rowe |
| 2005/0213199 A1 | 9/2005 | Imai et al. |
| 2006/0018429 A1 | 1/2006 | Hoghoj et al. |
| 2006/0062351 A1 | 3/2006 | Yokhin et al. |
| 2007/0189459 A1* | 8/2007 | Eaton et al. .................... 378/143 |
| 2009/0041198 A1 | 2/2009 | Price et al. |
| 2009/0074146 A1* | 3/2009 | Lee et al. ....................... 378/143 |
| 2009/0147922 A1 | 6/2009 | Hopkins et al. |
| 2010/0296171 A1 | 11/2010 | Lee et al. |

FOREIGN PATENT DOCUMENTS

EP 0128026 B1 8/1989
WO 2009024669 A2 2/2009

OTHER PUBLICATIONS

Tournear et al., "Gamma-Ray Channeling in Layered Structures", IEEE, pp. 4282-4285, 2004.
Koji et al., "Generation of Single-Mode Resonant Transition Radiation in the Soft X-Ray Region from a Multilayer Ni/C Target", Journal of Electron Spectroscopy and Related Phenomena (101-103), 1999, pp. 897-901.
Bajt et al., "Multilayers for Next Generation X-Ray Sources", Proc of SPIE vol. 6586, 65860J, 2007, 10 pages.

* cited by examiner

Primary Examiner — Irakli Kiknadze
(74) Attorney, Agent, or Firm — Seema S. Katragadda

(57) ABSTRACT

An integrated X-ray source is provided. The integrated X-ray source includes a target for emitting X-rays upon being struck by one or more excitation beams, and one or more total internal reflection multilayer optic devices in physical contact with the target to transmit at least a portion of the X rays through total internal reflection to produce X-ray beams, wherein the optic device comprises an input face for receiving the X rays and an output face through which the X-ray beams exit the integrated X-ray source.

22 Claims, 5 Drawing Sheets

INTEGRATED X-RAY SOURCE HAVING A MULTILAYER TOTAL INTERNAL REFLECTION OPTIC DEVICE

BACKGROUND

This disclosure relates to X-ray imaging systems, and, in particular, to X-ray imaging systems employing optic devices to produce X-ray beams having desired spectral shape and properties.

Conventional laboratory sources produce a large cone of X rays, the majority of which typically are not utilized to analyze a sample in an X-ray system. X-ray optics may be used to redirect some of these unused X rays into useful directions. However, the efficiency of redirection decreases with increasing distance between the X-ray generation point inside the X-ray source and the collecting/redirecting optic(s). This decrease is typically due to the decrease in X-ray intensity with increasing distance between the X-ray generation point and the optics. Specifically, the X-ray intensity decreases as the square of the distance between the optics and X-ray generation point. Additional issues with respect to an X-ray source point and optics arrangement include: alignment of the optics and the X-ray generation point, and drifting of the X-ray beam generation point due to target heating or lack of dynamic electron beam control.

The optimal position for disposing the optic to obtain maximum X-ray intensity would be at the X-ray generation point, however, with commercially available optics such as polycapillary optics or the singly- or doubly-curved diffractive optics such an arrangement is not feasible. Currently, polycapillary and multilayer diffractive optics are the only commercially available optics that collect a reasonable source solid angle and redirect the X rays into usable directions. The polycapillary channel size is too large to utilize small source spots, e.g. nanometer to micron-sized focal spots. Due to its large size, the polycapillary optics needs to be placed several hundred microns to centimeters away from the X-ray generation point. This large distance between the optics and the X-ray generation point reduces the intensity of the output X-ray beam that comes out of the optics. For both singly and/or doubly curved diffractive optics, the optics are typically placed at distances on the order of centimeters from the X-ray generation point to reduce the strain in the optics, which makes the optics difficult to manufacture and reduces the optic output beam quality. In addition to reducing the X-ray intensity, placing the optic at a large distance away from the X-ray generation point also reduces the robustness of the optic alignment with the X-ray generation point. Lastly, polycapillary optics are limited to transmitting X rays below 60 keV, which prevents them from being used in a number of non-destructive testing (NDT) imaging applications, e.g. computed tomography (CT) of electronic circuit boards.

It would thus be desirable to dispose the optic device on the X-ray generation point so as to obtain optimal X-ray intensity, and to address alignment issues between the optic device and the target.

BRIEF DESCRIPTION

In one embodiment, an integrated X-ray source is provided. The integrated X-ray source includes a target for emitting X-rays upon being struck by one or more excitation beams. Further, the integrated X-ray source includes one or more total internal reflection multilayer optic devices in physical contact with the target to transmit at least a portion of the X rays through total internal reflection to produce X-ray beams, where the optic device comprises an input face for receiving the X rays and an output face through which the X-ray beams exit the integrated X-ray source.

In another embodiment, an integrated X-ray source is provided. The integrated X-ray source comprises one or more total internal reflection multilayer optic devices that are configured to receive electrons, wherein the optic devices comprise at least one low-index material layer and at least one high-index material layer, where a target material is interspersed in the low-index material layer. The target material is configured to produce X-rays upon being struck by one or more excitation beams, where the optic devices transmit at least a portion of the X rays through total internal reflection to produce X rays, wherein the optic devices comprise an input face for receiving the X rays and an output face through which the X rays exit the integrated X-ray source.

In yet another embodiment, an X-ray imaging system is provided. The X-ray imaging system comprises a source of one or more excitation beams, and an integrated X-ray source. The integrated X-ray source includes a target for emitting X-rays upon being struck by the excitation beams from the electron source, and one or more total internal reflection multilayer optic devices in direct physical contact with the target to transmit at least a portion of the X rays through total internal reflection to produce one or more X-ray beams, wherein the optic devices comprise an input face for receiving the X-rays and an output face through which the X-rays exit the integrated X-ray source.

DETAILED DESCRIPTION

Figure 1:
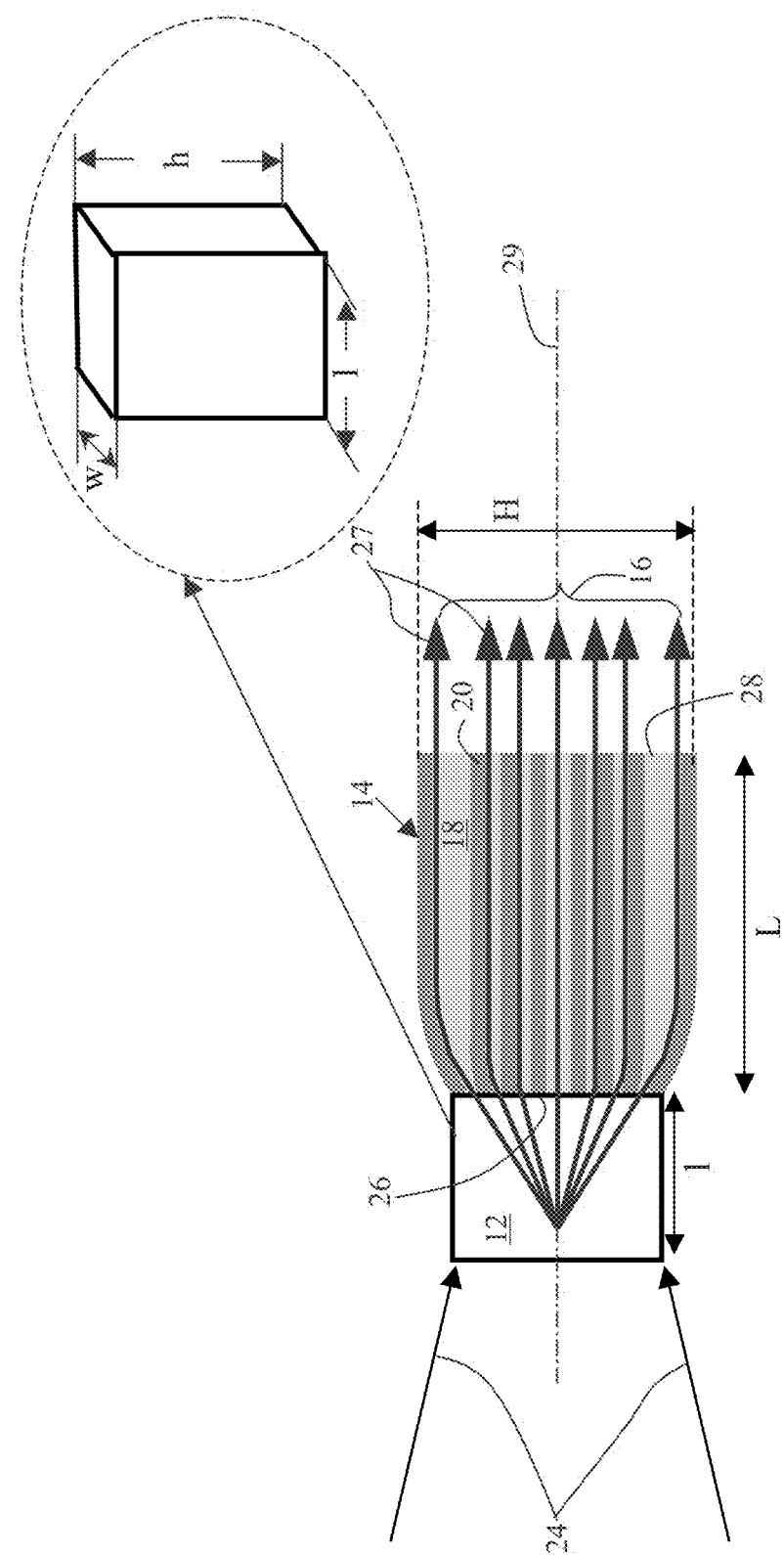
FIG. 1 is a cross-sectional view of an exemplary embodiment of an integrated source employing a transmission target and a multilayer optic device comprising alternating material layers with high and low indices of refraction, denoted as high-index material and low-index material herein, respectively.

Embodiments of the system relate to an integrated X-ray source having a target disposed in physical contact with one or more total internal reflection multilayer optic devices. The integrated X-ray source is configured to generate X rays and redirect the generated X rays via total internal reflection to produce X rays having desired beam shapes. The X-ray beams may include fan-shaped beams, beams with circularly symmetric cross-sections, or beams with elliptical cross-sec tions. Advantageously, the system enables greater X-ray flux output, and a more compact and robust design of the X-ray source.

The optic device may include an input face and an output face. The input face may be defined as the face of the optic device that is closer to the incident excitation source, and the output face may be defined as the face through which the redirected X-ray beams exit the optic device of the integrated X-ray source. In one embodiment, the input face may be the face of the optic device through which the X-rays produced by the target enter the optic device.

As used herein, the term "physical contact" encompasses presence of any additional material between the target and the optic device, where the material may be disposed between the target and the optic device to facilitate proper functioning of the integrated X-ray source. For example, the material may be disposed to facilitate coupling of the target and the optic device. In one example, an adhesive layer may be disposed between the target and the optic device. In one embodiment, there may not be any visible air gaps between the target and the optic device as seen by a naked eye.

It is known that target focal spots are not completely static and can move dynamically, in some cases by tenths of a millimeter or more. Advantageously, the integrated X-ray source obviates the need for alignment of the target and the optic devices with respect to each other by providing an optic device that is integrated to the target. The creation of a single entity that acts both as an X-ray transmission target and has the capability of redirecting the generated X rays into useful directions results in increased X-ray beam intensity.

Further, the size of the integrated X-ray source and the incident beam may be chosen such that the cross-section of the incident beam is larger than the cross-section of the target, the larger size of the incident beam ensures that the target is impacted by the incident excitation beams regardless of a shift in the position of the incident beam. Selecting suitable materials within the optic device may eliminate undesired energy levels from the output X-ray beam to produce X-ray beams having specific spectral properties. In one embodiment, the material selection within the optic device may reduce or eliminate high energies from the output X-ray beam, thereby allowing a bandpass of energies to exit the optic device. In one example, the energy widths of the output X-ray beam may be on the order of a few keV to a few tens of keV, if the input beam is for example a 100 kVp polychromatic spectrum. In one embodiment, the bandpass may be made sufficiently narrow to allow single photon energy to transmit through the optic device. In one embodiment, a k-edge filter may be used to reduce or eliminate low energies from the output X-ray beam. In this embodiment, the k-edge filter may be disposed either on the input face or the output face of the optic device. Alternatively, the k-edge filter may be disposed within the optic device. In embodiments where the k-edge filter is disposed on the input face, the filter may be disposed between the target and the optic device. In embodiments where the k-edge filter is disposed within the optic device, the k-edge filter may be disposed throughout the high-index material layers. Non-limiting examples of materials for the k-edge filter may include erbium. Combination of suitable filter and optic device materials may be used to allow single energy photons to be transmitted through the integrated X-ray source. In one example, the integrated X-ray source may allow 59.3 KeV of the tungsten K-alpha emission characteristic to be transmitted through the optic device. In some embodiments, the output X-ray beam may be a monochromatic X-ray beam. The monochromatic X-ray beam may be produced by employing k-edge filters with appropriate material selection of the optic device material to allow single energy to exit the optic device. In one example, a polychromatic X-ray beam may be produced by proper selection of material for the layers of the optic device. Further, the undesired energy ends may be minimized or eliminated using the total internal reflection within the optic device. Additionally, the optic could be dynamically cooled, thereby providing additional target cooling, again allowing the generation of a more intense beam than with a stand-alone transmission target.

A minimum of three different materials are used in a graded multilayer stack to obtain increased total internal reflection over current practice by maximizing the difference in real refractive indices between successive layers, with the real refractive index decreasing in successive layers. In an embodiment that provides even greater total internal reflection, the ratio of the change in imaginary part of the refractive index to the change in real refractive index between successive layers is minimized by simultaneously minimizing the change in the imaginary part and maximizing the change in the real part of the refractive index between successive layers. The imaginary part of the refractive index is related to the mass-energy absorption coefficient of the material in which the X ray is traveling. Additionally, each successive layer has higher X-ray mass-energy absorption properties, while the real refractive index decreases monotonically from layer to layer. These criteria provide for optimal changes in real refractive index and X-ray absorption properties than in current reflective X-ray optics materials.

Generally, the complex refractive index 'n' of a material at X-ray energies can be expressed as $n=1-\delta+i\beta$, where the term $(1-\delta)$ is the real part of the complex refractive index of the material and the parameter $\beta$ is the imaginary part of the complex refractive index and is related to the mass-energy absorption coefficient in the material. At X-ray energies, the real part of the refractive index is very close to unity and is therefore usually expressed in terms of its decrement $\delta$ from unity, with $\delta$ typically on the order of $10^{-6}$ or smaller for energies above 60 keV.

For improved reflectivity, in one embodiment, the ratio of the change in $\beta$ to the change in $\delta$ between adjacent multilayer materials is generally minimized. For the purposes of this disclosure, a first layer is considered adjacent to a second layer when there are no other materials interposed between the first and second layers that have a real refractive index or a coefficient of absorption that are different from the respective real refractive indices or coefficients of absorption of the first and second layers. The graded multilayer optic may be adapted for use in redirecting an incident X-ray beam through total internal reflection as a reflected X-ray beam. The optic device may be configured to produce circularly symmetric beams, beams with elliptical cross-sections, or a stack of fan-shaped beams. The graded multilayer stack may comprise a plurality of multilayer zones. The graded multilayer optic device may be made by employing the techniques disclosed in the commonly assigned application titled "OPTIMIZING TOTAL INTERNAL REFLECTION MULTILAYER OPTICS THROUGH MATERIAL SELECTION" having application Ser. No. 12/469,121.

In certain embodiments, the imaging system includes one or more graded multilayer optic devices in communication with the target to transmit at least a portion of the X rays through total internal reflection to produce one or more X-ray beams having desired shape and spectral properties. The graded multilayer optic devices include a first graded multilayer section for redirecting and transmitting X rays through total internal reflection. The first graded multilayer section includes a high-index layer of material having a first complex refractive index $n_1$. The first complex refractive index $n_1$ includes a real part $Re(n_1)$ of the first complex refractive index and an imaginary part $\beta_1$ of the first complex refractive index. The real part $Re(n_1)$ of the first complex refractive index may also be represented as $(1-\delta_1)$. The first graded multilayer section further includes a low-index layer of material having a second complex refractive index $n_2$. The second complex refractive index includes a real part $Re(n_2)$ of the second complex refractive index and an imaginary part $\beta_2$ of the second complex refractive index. The real part $Re(n_2)$ of the second complex refractive index may also be represented as $(1-\delta_2)$. The first graded multilayer section also includes a grading zone disposed between the high-index layer of material and the low-index layer of material. The grading zone includes a grading layer having a third complex refractive index $n_3$. The third complex refractive index $n_3$ includes a real part $Re(n_3)$ of the third complex refractive index and an imaginary part $\beta_3$ of the third complex refractive index. The real part $Re(n_3)$ of the third complex refractive index may also be represented as $(1-\delta_3)$ such that $Re(n_1)>Re(n_3)>Re(n_2)$. As used herein, the term "imaginary part of the complex refractive index" corresponds to the mass-energy absorption coefficient.

The target may be configured to emit X rays upon being struck by incident beams. The incident beams may include one or more of neutral particle beams, charged particle beams, or photon beams. Non-limiting examples of the target material may include tungsten, copper, silver, molybdenum, rhodium, or chromium. In some embodiments, the target may be made of a single material. In other embodiments, the target may include a plurality of materials such that at least one of the plurality of materials is an X-ray emitting material. In one embodiment, the X-ray emitting material may include one or more heat removing materials, or electrical discharge removing materials, or both. In one example, the target may be made of one or more radioactive materials. The target may either be a transmission target or a reflection target. In case of transmission target, the target may be disposed on the input face of the optic device.

In case of transmission targets, the target may be disposed on the input face of the optic device such that the target and the input face of the optic device are in physical contact. In this case, the incoming excitation from the source strikes the target to produce X rays, the produced X rays are transmitted through the target layer to reach the optic device. The optic device then re-directs these X rays to produce X-ray beams having desired shape and spectral properties. In one embodiment, the target may be present in the form of a layered structure. The layered structure of the target may include a continuous layer or a patterned layer. Further, the layered structure may include a single layer or a plurality of layers. In the case of the plurality of layers, the different layers of the target may be made of the same or different materials. The layers of the target may be made of one or more materials. The materials of the target layers may be selected based on the X-ray energies desired. In the case of the plurality of layers, only some of the layers of the plurality of layers may be configured to emit X rays upon being impacted by the incident beams. For example, the plurality of layers may include an X-ray emitting layer disposed between layers that may at least partially remove heat and electrical charge from the X-ray emitting layer. In one example, at least one diamond layer, or at least one graphene layer may be disposed adjacent to the X-ray emitting layer. In one embodiment, the X-ray emitting layer may include tungsten, rhodium, molybdenum, rhodium-molybdenum alloy, copper, diamond, and alloys thereof.

The dimensions of the target may be such that the target may efficiently stop the incident beam(s) impacting the target to produce X rays in the process, while minimally absorbing the generated X rays. The dimensions of the target may be large enough to prevent the target from suffering any structural damage that may be caused due to the impact of the incident beams. The dimensions of the target may be on the order of a few microns and may vary depending on the X-ray energies desired in the output X-ray beam and the selection of materials. In one embodiment, the target may be approximately perpendicular to the layers of the optic device. Further, the target may or may not have a uniform dimension (also referred to as "height") in a direction perpendicular to the optic axis of the optic device. In one embodiment, the height of the target may be greater at its center than along the circumference/periphery. In an alternate embodiment, the target layer may include a stepped structure. In this embodiment, the target may include two or more steps. Each step may be in physical contact with a corresponding optic device. In other words, each of the steps may be associated with one or more optic device. The steps may be designed so as to produce multiple X-ray beams, with each of the X-ray beams having specific spectral and/or spatial properties. In one example, the plurality of X-ray beams may produce a focused X-ray beam, or a fan-shaped X-ray beam. Envisioning the layer of the target as a cuboid, the two opposite sides of the cuboid, one of which is coupled to the optic device, may or may not be parallel to each other. In one embodiment, the side away from the optic device may be skewed at a determined angle.

In one example, the target may include a patterned structure. The patterned structure may be selected such that target material is disposed on those portions of the input face of the optic device that correspond to high-index layers of the optic device. In one example, the patterned structure may comprise a plurality of strips, where the strips containing the target material correspond to the portions of the input face having the high-index material or high-index and graded zone materials, and the gaps between the strips correspond to low-index materials. In other words, the pitch between the strips may be adjusted according to the height of the layers of the optic device. In one embodiment where the target includes a patterned structure, the low-index layer may be interspersed with the target material. For circularly symmetric optic devices, the strips comprising the target material may comprise concentric rings. In another embodiment, the low-index layer within the optic may be made from the target material. In one embodiment, a non-patterned target material is disposed on the front face of the optic, while the low index layers within the optic are made from the same or different target materials. This increases the intensity of the X-ray beam emitted by the optic, since the target material interior to the optic device can emit X rays in addition to the usual x rays emitted by the target material on the front optic face. In another embodiment, the target material for the patterned target is combined with low-index materials inside the optic being made from the same or different target material. The materials may be selected to produce a complex X-ray beam spectrum having specific desired spectral properties. In one example where the patterned target material is made from molybdenum, and the low-index materials are made from tungsten, the X-ray beam exiting the optic may have a well-separated (in energy) characteristic photon energies from each material. The well-separated energy spectrum is desirable, for example, in multi-energy imaging.

The presence of high melting point and thermally conducting materials in the optic multilayer integrated with the target enables the optic device to act as a heat sink for the transmission target, permitting the target to be operated at higher flux densities than are normal for a transmission target, which is difficult to actively cool. Furthermore, the optic device may be placed in an actively cooled housing, providing further target cooling and further X-ray intensity increases. Non-limiting examples of thermally conducting materials may include diamond or diamond-like carbon (DLC). In one embodiment, one of the graded layers in the optic device may be made of thermally conducting material to provide thermal conductivity throughout the optic device. In an alternate embodiment, the thermally conducting layer may be made as part of the target disposed on the front face of the optic. In one example, such a thermally conducting layer may be made of diamond, since diamond is relatively transparent to high-energy (>60 keV) X rays.

In case of reflection target, the target material may be present within the structure of the optic device. For example, the target material may be present in any of the layers of the optic device. For example, the target material may be present in the high-index material layer, or low-index material layer, or one or more layers of the grading zone. By way of example, the target material may be disposed in the low-index material layer of the optic device. In one embodiment, the low refractive index may be formed using the target material. In another embodiment, the low-index material layer may be interspersed or doped with the target material. In one example, the target may include a radioactive isotope. In this example, the low refractive index material layer of the optic device may be made of a radioactive isotope. In examples where the low-index material layer comprises the target material, the low-index material layer may include materials, such as but not limited to, tungsten, osmium and americium. In examples where the grading zone comprises the target material, the grading zone may include materials, such as but not limited to, gold, silver, molybdenum, cobalt, copper or chromium. In examples where the high-index material layer comprises the target material, the high-index material layer may include materials, such as but not limited to, magnesium, aluminum or silicon.

In case of reflection targets, the optic device is pointed and spatially limited, the electric potential at the tip is higher than any surrounding support structure. The electron beam may be attracted to this high point compared to flat targets. This feature improves the positional stability of the X-ray generation point.

In one embodiment, the integrated X-ray source may employ both transmission and reflection targets to produce monochromatic or polychromatic X-ray beams. In this embodiment, the target may be a combination of transmission and reflection targets. For example, the target may comprise a patterned structure with patterns disposed on portions of the input face of the optic device that corresponds to high-index layer, and the low-index layer may include target material disposed therein. In one example, the low-index layer may be made of low-index target material.

One or more graded multilayer optic devices may be employed for redirecting and reshaping X rays generated by the target to produce monochromatic or polychromatic X-ray beams having desired spectral shape. The layers in the optic device may be shaped geometrically to collect a large solid angle of the generated X rays and redirect them via total internal reflection into determined directions for applications, such as but not limited to, computed tomography (CT) imaging, X-ray imaging, X-ray diffraction and X-ray fluorescence.

In one example, the output X-ray beam may be a fan-shaped beam for application (medical, industrial and/or security) in one or more of CT imaging, X-ray imaging, tomosynthesis imaging, or X-ray diffraction imaging. In one example, the integrated X-ray source may be employed in high-resolution non-destructive testing (NDT) CT applications. In certain embodiments, all or a portion of the X rays from the source spot are physically shaped into a single, collimated, fan beam while intentionally altering the spectral distribution. For example, the spectrum may be altered to include only the very low (<30 KeV) and/or very high (>200 KeV) energy ends of the source spectrum.

A plurality of optic devices may be stacked and in physical contact with the target to collect a majority (e.g., about 60 percent to about 90 percent) of the X rays from the target, and to produce a set of spatially shaped X ray beams. In one embodiment, the multilayer optic device may be circularly symmetric to generate a highly collimated beam in each spatial direction. In another embodiment, a stack of parallel fan beams is produced with the parallel direction perpendicular to the plane of the fan. In one embodiment, the graded multilayer optic devices may include pairs of stacked graded multilayer optic devices. In one example, one half of a pair may be positioned to be a mirror image of the other half of the pair.

The graded multilayer optic sections stacked upon each other may have an exterior surface sloping between an input and an output face. In certain embodiments, each layer at the optic input (side closest to the source) may be curved at the same or different radius of curvature enabling the combined layers in the optic device to capture a large source solid angle (see e.g., FIG. 3).

The number of multilayer zones comprising the multilayer material stack is not limited in any way but is rather a function of the particular application for which the multilayer material stack is configured. The multilayer material stack may comprise tens or thousands of multilayer sections. For example, in the case of high-resolution industrial CT where the resolution is on the order of micrometers, the number of multilayers in the stack maybe less than ten layers. In other types of CT, where large optic collection angles are desired, the number of layers may be in the thousands. In addition to a high-index layer, a low-index layer, and a grading zone with one or more grading layers disposed between the high-index layer and the low-index layer, the multilayer optic device may also comprise an X-ray opaque cladding layer at the outermost surface of the optic device to prevent the emission of X-ray radiation from the interior of the optic device through the edges of the non-emitting face of the device. The X-ray opaque cladding layer may be disposed on the optic device such that X-rays enter the optic device through the input face and exit the optic device substantially through the optic output face.

Typically, high refractive index materials transmit X rays with minimal losses, whereas, low refractive index materials substantially block X-ray transmission. In the case of the interspersed target, the target material may be disposed in one or more low-refractive index material layers of the optic device. The amount of the target material present in the low refractive index material layer of the optic device may be decided based upon the desired output X-ray flux, or intensity. It may be desired to prevent the incident source excitation (photon or electron) from impinging on some of the high refractive index material layers of the optic device. In one embodiment, a blocking layer may be disposed on the input face of the optic device to selectively block the source excitation from reaching specified portions of the optic device. In one example, the blocking layer may be selectively disposed on portions of the input face of the optic device that correspond to the high refractive index material layer. The incident excitation thus impacts only the low refractive index material layer. The target material disposed in the low refractive index material layer enables production of X rays upon interaction with the incident excitation. When the produced X rays encounter an interface between a high and low refractive index material, the X rays may be reflected via total internal reflection back into the high refractive index material with high efficiency, if the X rays are traveling from the low to high refractive index material. The value of the critical angle for total internal reflection depends on the materials and the incident X-ray energy. The use of the graded multilayer optic device enables X rays of desired energies to be reflected via total internal reflection with high efficiency. Shaping the layers with the appropriate curvature and fabricating them with the appropriate heights may produce output beams having desired properties.

The thickness of the incident X-ray beam may be smaller or greater than a height of one multilayer section. When the thickness of the incident X-ray beam is greater than the height of one multilayer optic device, different parts of the incident X-ray beam may pass through and be totally internally reflected by some or all of the multilayer sections within the optic device, and emerge from the multilayer sections as corresponding parts of the reflected photon beam. Alternatively, when the thickness of the incident photon beam is smaller than the height of one optic device, the device may produce smaller flux gains but can provide useful redirection capabilities.

The optic device provides an advantage in terms of spatial scale and flexibility of the integrated X-ray source. Due to the nature of the micro-fabricated, layered structure, the optic devices may be very small. In one example, a cross sectional size of the devices may be as small as tens of micrometers. The samples to be imaged are typically disposed at a distance of about 1 meter or more from the X-ray integrated source, hence, the output X-ray beam from the source needs to diverge from about 1 mm to about several centimeters or more. Advantageously, the integrated X-ray source is configured to reduce the source power needed to produce the same sized beams as produced by conventional sources at the sample.

The integrated X-ray source may be enclosed within a housing having an X-ray transparent window. In the case of transmission targets, the integrated X-ray source may be mounted within or exterior to the housing. In one embodiment, the target may be optically coupled to the window, either interior or exterior to the housing. In one example, the integrated X-ray source may form part of the window. In the case of reflection targets, the optic device of the integrated X-ray source may be located almost exclusively internal to the source vacuum, with its output face towards the X-ray window through which the X rays exit the source housing. In one example, the optic device may serve as the X-ray window through which the X rays exit the source. Advantageously, replacing the conventional X-ray window with the optic device simplifies the source design and provides significantly greater X-ray flux output than without the optic device.

FIG. 1 is a diagrammatical cross-sectional illustration of an exemplary embodiment of an integrated X-ray source 10. The integrated X-ray source includes a target 12 in physical contact with a total internal reflection multilayer optic device 14. The target 12 may be a layered structure having one or more layers. The number and material of the layers of the target 12 may be governed by the incident excitation (electrons or photons, e.g., X rays or gamma rays) and the desired output X-ray beams 16. The target 12 may be a continuous layer or a patterned layer, the structure of the target 12 may depend on the material used in the plurality of layers of the optic device. The optic device 14 includes high-index layers 18 and low-index layers 20 that are alternatingly disposed. Reflecting interfaces are formed between each pair of high-index layers 18 and low-index layers 20. The height (h) and length (l) of the target may be such that the target may efficiently stop the incident beam(s) impacting the target to produce X rays in the process, while minimally absorbing the generated X rays.

Incident excitation beams 24 may be provided by an excitation source (not shown). The incident excitation beams 24 may include particle beams—for example electrons—or photon beams—such as X rays or gamma rays. The incident excitation beams 24 are directed to the X-ray integrated source 10 to impact on an input face 26 of the optic device 14. X-ray beamlets 27 are generated as a result of the incident excitation beams 24 striking on the target layer 12. The X-ray beamlets 27 are transmitted through the target 12 into the optic device 14, where the X-ray beamlets 27 follow transmission paths defined within the optic device 14. Using the transmission paths of the optic device 14, the X-ray beamlets 27 are guided towards the output face 28 of the optic device 14. The output X-ray beam 16 may be a parallel beam, or any other beam shape depending on the curvature of the optic device. Although the output X-ray beam 16 is shown in the illustration as separate parallel X-ray beamlets 27, it should be understood that the X-ray beam 16 is physically a continuous beam distributed over a specified solid angle of emission, and that the representation of the X-ray beam 16 as discrete beamlets is made only to facilitate the presentation of the various exemplary embodiments herein.

The height (H) of the optic device 14 may be a sum of individual heights of the various layers of the optic device 14. In one embodiment, the height of an individual high refractive index layer 18 may be in a range from about 3 nm to about 50 nm. The height of an individual low refractive index layer 20 may be in a range from about 1 nm to about 10 nm. In one example, the height of the high refractive index layers 18 may be about 150 nm, and the height of the low-index layers 20 may be about 3 nm. The height (H) and length (L) of the optic device 14 may be decided based on the transmission path required for X-ray beamlets 27 to provide a desired beam shape at the output face 28 of the optic device 14.

For ease of illustration, only a few layers have been drawn with reference to multilayer optic 10. However, it should be appreciated that any number of layers, including into the hundreds, thousands, or millions of layers, can be fabricated to utilize total internal reflection to form the various types of photon beams listed previously.

In the illustrated embodiment, the central axis of the optic device 14 is coincident with a central axis 29 of the target 12. In embodiments where the optic device 14 is symmetric about the central axis, the resultant beam may be a concentric beam uniform about the central axis 29. The beam shaped may be circularly symmetric about the central axis 29. However, it should be noted that other beam arrangements such as non-concentric or non-circular asymmetric beam shapes may also be produced using the integrated X-ray source of the system.

Figure 2:
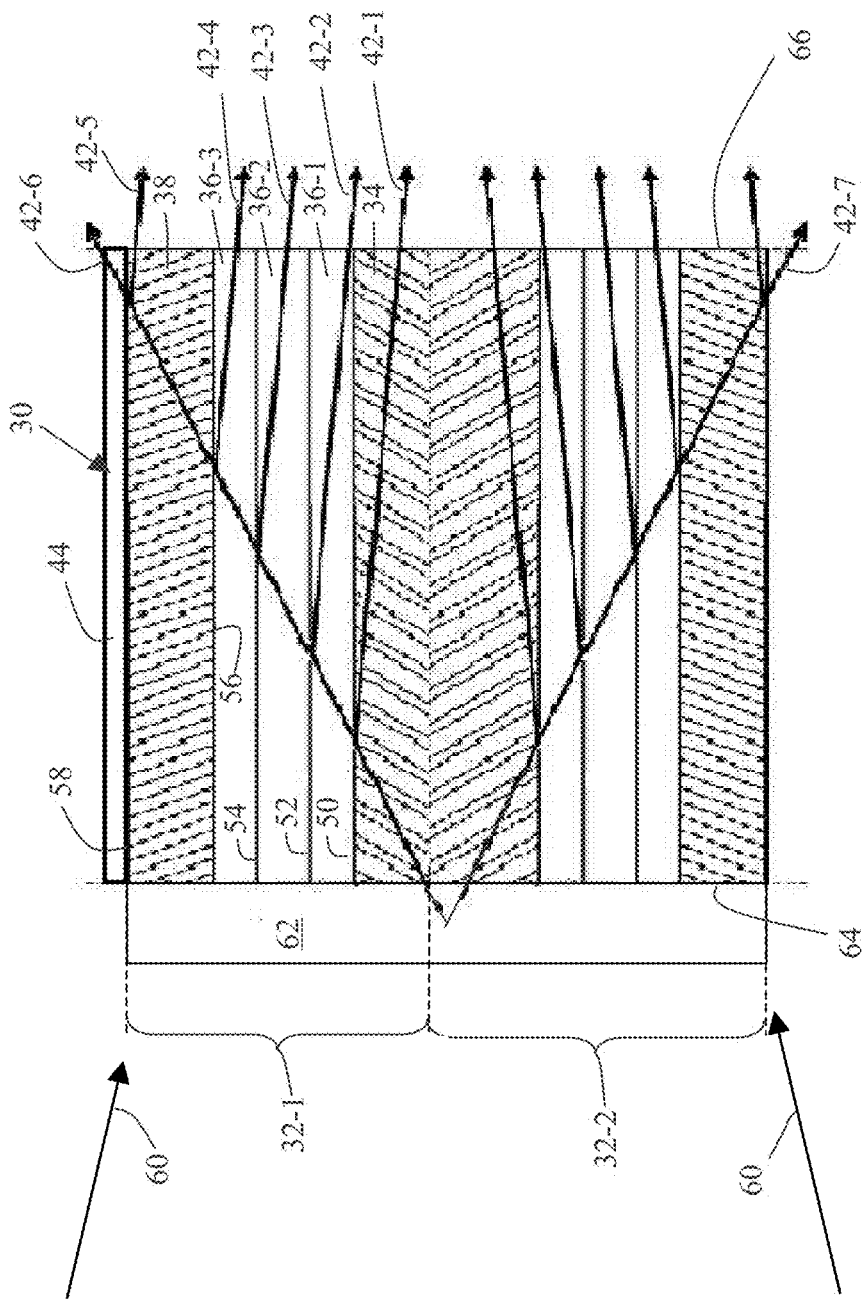
FIG. 2 is a cross-sectional view of an exemplary embodiment of an integrated source employing a transmission target and a graded multilayer optic device comprising high-index material layers, a grading zones and low-index material layers.

Referring now to FIG. 2, an integrated source comprising a target 62 and a multilayer material stack 30 is illustrated. The multilayer material stack 30 includes an input face 64 and an output face 66. The multilayer material stack 30 further comprises first and second multilayer zones 32-1 and 32-2, each multilayer zone comprises multiple layers of materials, each layer of material having a unique real refractive index n, an absorption coefficient $\beta$, and a height h. In the example provided, the multilayer zones 32-1 and 32-2 each include: (i) the high-index layer 34 with a real refractive index $n_1$, an absorption coefficient $\beta_1$, and a height $h_1$; (ii) the grading zone 36 with a plurality of grading layers, here represented by grading layers 36-1 through 36-3, and (iii) the low-index layer 38 with a real refractive index $n_2$, an absorption coefficient $\beta_2$, and a height $h_2$, disposed on the grading zone 36.

The material forming the first grading layer 36-1 has a real refractive index $n_3$, an absorption coefficient $\beta_3$, and a height $h_3$, disposed on the high-index layer 34. The material forming the second grading layer 36-2 has a real refractive index $n_4$, an absorption coefficient $\beta_4$, and a height $h_4$, disposed on the first grading layer 36-1, and the material forming the third grading layer 36-3 has a real refractive index $n_5$, an absorption coefficient $\beta_5$, and a height $h_5$, disposed on the second grading layer 36-2. The heights of the high-index layer 34 and the low-index layer 38 may typically be on the order of nanometers to microns depending on the desired output beam divergence, and the heights of the grading layers 36-1 through 36-3 may typically be on the order of nanometers to microns also.

It should be understood that the number of multilayer zones comprising the multilayer material stack 30 are not limited in any way but is rather a function of the particular application for which the multilayer material stack 30 is configured. The multilayer material stack 30 may comprise hundreds or thousands of multilayer zones. Each multilayer zone 32-1 through 32-N includes a high-index layer 34, a low-index layer 38, and a grading zone 36 with one or more grading layers disposed between the high-index layer 34 and the low-index layer 38. The material layers making up each multilayer zone are selected and arranged in accordance with methods described herein. The multilayer material stack 30 may also comprise a photon-opaque cladding layer 44 at an outer surface of the multilayer material stack 30 to prevent the emission of photon radiation from the $1^{St}$ multilayer zone 32-1.

X-ray beam 40 is produced as a result of incident excitation beams 60 striking on the transmission target 62. The incident excitation beams 60 is comprised of excitation beams (e.g. electron or gamma-rays) beams striking the target 62 for generating X-ray beams 40. A first part of the X-ray beam 40 undergoes total internal reflection at a first interface 50, formed between the high-index layer 34 and the first grading layer 36-1, and emerges from the multilayer material stack 30 as a first beamlet 42-1. Most of the incident photon beam 40 is reflected by the first and second multilayer zones, 32-1 and 32-2, but very weak beamlets 42-6 and 42-7 pass into the next multilayer zones (not shown). Note also that the illustration is not drawn to scale, and that the material layer heights and the angles of incidence and reflection for the incident photon beam 40 are exaggerated for clarity of illustration.

A second part of the incident photon beam 40 reflects at a second interface 52 and emerges from the multilayer material stack 30 as a second beamlet 42-2. In an exemplary embodiment, the second beamlet 42-2 has a different intensity from that of the first reflected beamlet 42-1, and is usually of much lower intensity. For example, an even lower intensity, third part of the incident photon beam 40 may reflect at a third interface 54 and emerge from the multilayer material stack 30 as a possibly even lower intensity third beamlet 42-3. Similarly, a yet lower intensity, fourth part of the incident photon beam 40 may reflect at a fourth interface 56 and emerge as a still lower intensity fourth beamlet 42-4. And, in the illustration provided, a still lower intensity, fifth part of the incident photon beam 40 may reflect at a fifth interface 58 and emerge as a yet lower intensity beamlet 42-5, leaving a negligible portion of the incident beam 40 to pass into the next multilayer zone (not shown) as the spurious, very low intensity, beamlet 42-6.

Figure 3:
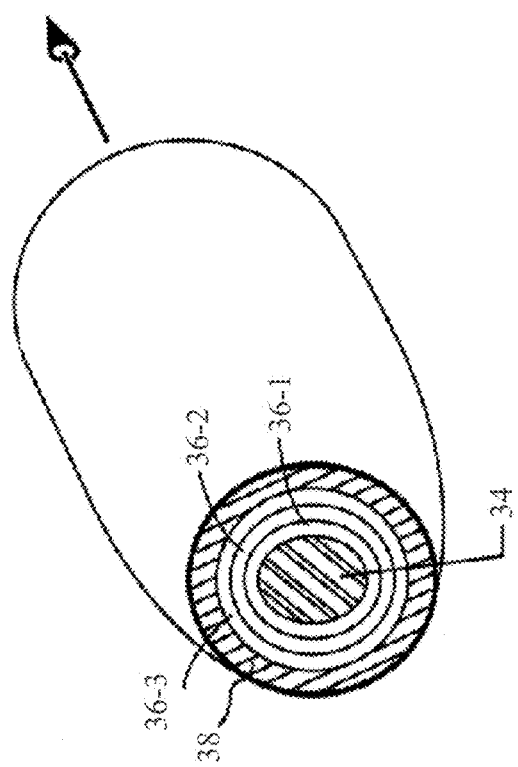
FIG. 3 is a cross-sectional view of the optic device of FIG. 2 having multilayer zones in the multilayer material stack of the optic device, each multilayer zone having a grading zone deposited on a high-index material layer.

FIG. 3 illustrates an isometric diagrammatical representation of the multilayer zone 32-2 of the optic device 30 of FIG. 2. In the illustrated embodiment, the high-index core 34 may comprise a rod-like structure. The cross-section of the core may or may not be circular. For example, in alternate embodiments, the core may have a hexagonal, rectangular, square, or any other geometric shape cross-sectional area. The cross-sectional shape of the high-index core 34 may be determined by the particular geometry of a high-index fiber material, such as beryllium or boron used for fabrication of the high-index core 34, without effecting functionality of the optic device 30. It should be noted that the concentric multilayer zone 36-1 through 36-3 is not restricted to three layers, and may have hundreds or thousands or millions of concentric multilayer zones. A portion of the outer low-index layer 38 comprises a convex surface curved toward the longitudinal axis of the optic device. It should be noted that in place of the convex surface, the optic device 30 may comprise a saddle surface (not shown) close to the output face 66 of the optic device 30. In one embodiment, the saddle surface may result in the input face of the optic device having a relatively larger cross-sectional area compared to the output face. The presence of saddle surface in the optic device may allow for conversion of a convergent input beam into a substantially collimated output beam. Further, the input face may be planar or curved in concave or convex or complex curved shapes.

Cylindrical grading layers 36-1, 36-2 and 36-3 physically enclose the high-index core layer 34, and an outer low-index layer 38 encloses the grading layers 36-1, 36-2 and 36-3.

Figure 4:
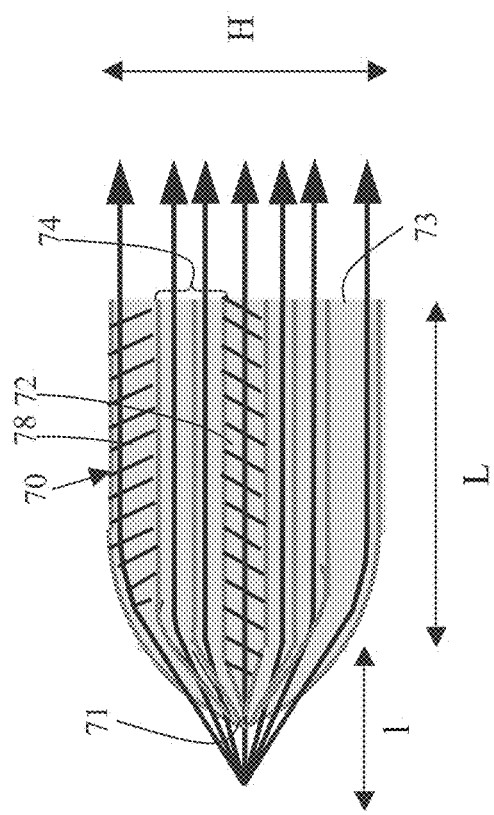
FIG. 4 is a cross-sectional view of an exemplary embodiment of an integrated source employing a reflection target and a total internal reflection multilayer optic device, where the target material is disposed within the layers of the optic device.

FIG. 4 comprises an integrated X-ray source employing a reflection target and a multilayer optic device 70. The reflection target is present within the optic device 70. The optic device comprises an input face 71 and an output face 73. The optic device comprises a core 72 made of high-index material, grading zones 74 having grading layers and low-index layers 78. The low-index layers 78 may be doped or interspersed with the target material. Alternatively, the low-index layer may be made of target material. Non-limiting examples of low-index materials may include osmium, tungsten. In one embodiment, the different low-index layers may comprise different target materials. When such an integrated X-ray source is bombarded with incident excitation beams, two different spectra of X-rays corresponding to the two different target materials may be generated. In another embodiment, each of the low-index layers 78 may comprise two or more different target materials having low refractive index.

In this embodiment, portions of the input face 71 corresponding to the high-index core 72 and the grading zones 74 may comprise a blocking material, such as but not limited to an absorber or a reflector material disposed thereon. The blocking material minimizes or prevents any damage to the material of the optic device 70 which may be otherwise caused due to impact of the striking incident excitation beams.

Figure 5:
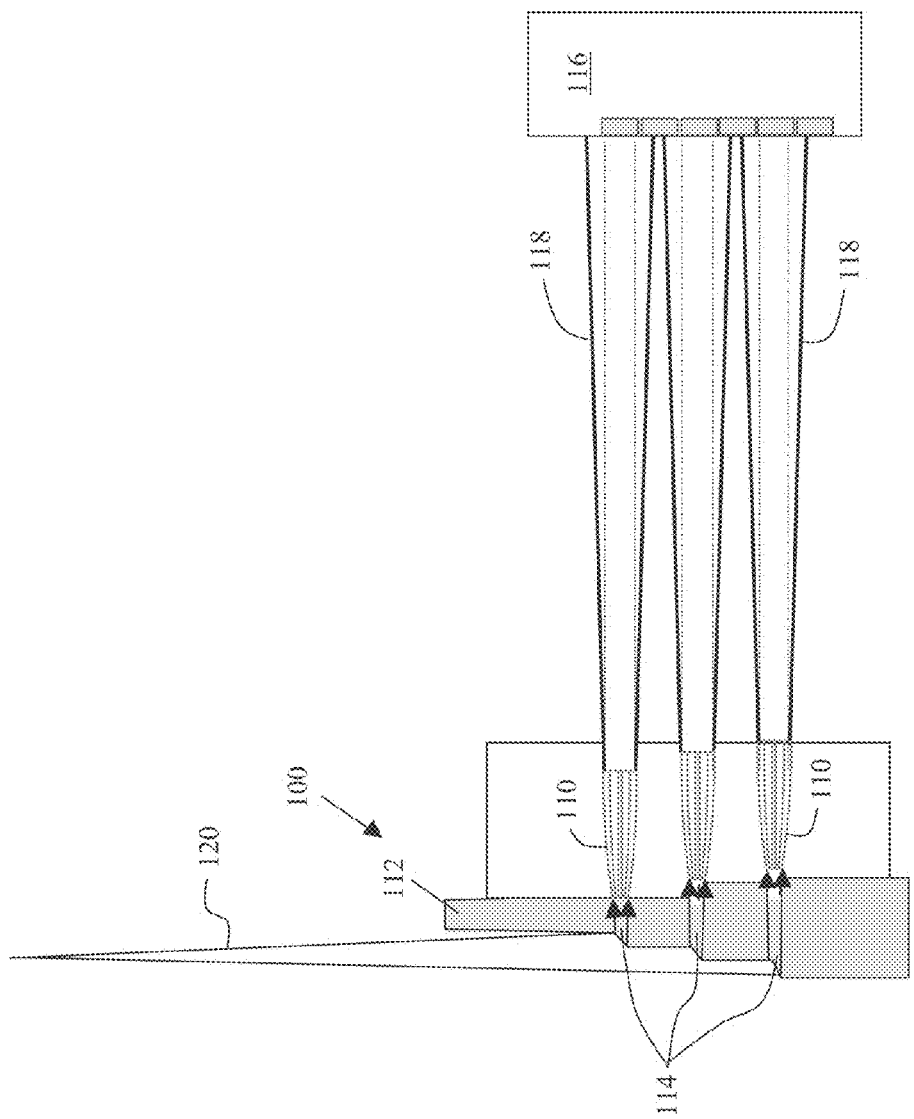
FIG. 5 is a perspective view of an integrated source employing a stepped transmission target having a plurality of steps, where each step is in physical contact with a corresponding total internal reflection multilayer optic device.

FIG. 5 illustrates an arrangement for producing polychromatic X-ray spectra using integrated X-ray source 100. The integrated X-ray source 100 includes a plurality of optic devices 110. The structure of the optic devices 110 may be the same or different. The transmission target 112 comprises steps 114. Each of the steps may be designed to enable generation of X-rays of a particular energy level upon being struck by electron beam 120. The corresponding optic devices 110 may be configured to redirect and reshape X rays of a particular energy. The low-index material layers of the optic devices 110 may or may not include target material.

The length of steps 114 may be less than a micron or as large as tens of millimeters or more. Large size of the steps 114 may increase the flux incident on the input face of optic devices 110. By increasing the length of steps 114 and increasing the incident angle (e.g., approaching 90 degrees) of the electron beam 120 on the steps 114, flux incident on the input surface of the optic device may be increased. Increased incident flux enables higher intensity X-ray beams 118 at the output face of the optic devices 110.

Each of the steps 114 may be maintained at a particular potential. In one embodiment, greater energy separation between the X rays generated in the different optic devices 110 may be achieved by maintaining the steps 114 at different accelerating potentials and taking sequential images using the detector 116 with X rays 118 emitted by each accelerating potential/optic combination. Advantageously, spectral shaping facilitates optimizing the effectiveness of a multitude of X-ray inspection and scanning procedures otherwise required in CT, X-ray radiographic, or X-ray diffraction applications. Although discussed in terms of considering differences of images at multiple energies, as will be appreciated by one skilled in the art, standard projection-based and image-based energy sensitive decomposition methods may be utilized to characterize the effective atomic number of the imaged objects.

The applications in which this system is anticipated to be used are non-destructive testing ones that currently suffer from insufficient x-ray flux, making data collection times impractical for industrial in-line testing. These NDT applications are anticipated to be high-resolution CT, X-ray radiography, x-ray diffraction, and x-ray fluorescence. In the specific case of NDT x-ray diffraction (as opposed to Security-related XRD), a circularly symmetric beam is used that is either monochromatic (usually for stress/strain measurements or powder samples) or polychromatic (for single crystal Laue measurements or energy-sensitive diffraction). In the monochromatic situation, typically a crystal is used to monochromate a polychromatic beam and in the process decreases the x-ray flux on the sample by between one and three orders of magnitude depending on the type of optics used. This low flux makes the diffraction measurement time too long for in-line inspection of parts, something that industry desires. In the Laue case, the beam must be very parallel and is accomplished through the use of a collimator that simply blocks the diverging x rays going in the wrong direction. Thus, the X-ray flux intensity is reduced by several orders of magnitude when imaging the sample, making the measurement times unreasonable for in-line parts inspection.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An integrated X-ray source, comprising:
   a target for emitting X rays upon being struck by one or more excitation beams; and
   one or more total internal reflection multilayer optic devices in physical contact with the target to transmit at least a portion of the X rays through total internal reflection to produce X-ray beams, wherein each of the optic devices comprises an input face for receiving the X rays and an output face through which the X-ray beams exit the integrated X-ray source.

2. The integrated X-ray source of claim 1, wherein the optic devices comprise:
   a first graded multilayer section for redirecting and transmitting X rays through total internal reflection including;
      a high-index material layer comprising a first complex refractive index $n_1$ having a real part Re $(n_1)$ and an imaginary part $\beta_1$;
      a low-index material layer comprising a second complex refractive index $n_2$ having a real part Re $(n_2)$ and an imaginary part $\beta_2$; and
   a grading zone disposed between said high-index material layer and said low-index material layer, the grading zone having a grading layer comprising a third complex real refractive index $n_3$ having a real part Re $(n_3)$ and an imaginary part $\beta_3$ such that $Re(n_1) > Re(n_3) > Re(n_2)$.

3. The integrated X-ray source of claim 1, wherein the excitation beams comprise one or more of neutral particle beams, charged particle beams, or photon beams.

4. The integrated X-ray source of claim 1, wherein the target comprises a plurality of materials, and wherein at least one of the plurality of materials is an X-ray emitting material.

5. The integrated X-ray source of claim 4, wherein the X-ray emitting material comprises one or more heat removing materials, or electrical discharge removing materials, or both.

6. The integrated X-ray source of claim 4, wherein the X-ray emitting material comprises tungsten, rhodium, molybdenum, rhodium-molybdenum alloy, copper, diamond, radioactive americium, radioactive cobalt, and alloys thereof.

7. The integrated X-ray source of claim 6, wherein the low-index material layer comprises tungsten, osmium, copper, silver, molybdenum, rhodium, radioactive americium, radioactive cobalt, or chromium.

8. The integrated X-ray source of claim 1, wherein the target comprises a radioactive material.

9. The integrated X-ray source of claim 1, wherein the target comprises a plurality of layers disposed on the input face of the one or more optic devices, and wherein at least one of the plurality of layers comprises an X-ray emitting layer.

10. The integrated X-ray source of claim 9, wherein the target comprises at least one diamond layer, or at least one graphene layer disposed adjacent to the X-ray emitting layer.

11. The integrated X-ray source of claim 1, wherein one or more materials of the optic devices are configured to emit X-rays upon being struck by the excitation beams.

12. The integrated X-ray source of claim 1, wherein a cross-section of the optic devices is rectangular, circular, oval, square, or polygonal shape.

13. The integrated X-ray source of claim 1, wherein the target is enclosed within a housing having an X-ray transparent window, the one or more optic devices are mounted within the housing, mounted external to the housing, fabricated as the window, or integrated into the window.

14. The integrated X-ray source of claim 13, wherein the output face of each of the optic devices is mounted parallel to the window, or integrated into the window.

15. The integrated X-ray source of claim 1, wherein the X-ray beams are fan-shaped X-ray beams.

16. The integrated X-ray source of claim 1, wherein a cross-sectional area of the excitation beams is greater than a cross-sectional area of the target.

17. An integrated X-ray source, comprising:
one or more total internal reflection multilayer optic devices that are configured to receive electrons, wherein the optic devices comprise at least one low-index material layer and at least one high-index material layer, wherein a target material is interspersed in the low-index material layer, wherein the target material is configured to produce X-rays upon being struck by one or more excitation beams, wherein the optic devices transmit at least a portion of the X rays through total internal reflection to produce X rays, and wherein each of the optic devices comprise an input face for receiving the X rays and an output face through which the X rays exit the integrated X-ray source.

18. The integrated X-ray source of claim 17, wherein the one or more excitation beams comprise one or more of neutral particle beams, charged particle beams, or photon beams.

19. The integrated X-ray source of claim 17, comprising two or more low-index material layers, wherein one or more low-index material layers comprise different materials.

20. The integrated X-ray source of claim 17, wherein the optic devices redirect the X-rays at energies above about 60 keV.

21. An X-ray imaging system, comprising:
a source of one or more excitation beams;
an integrated X-ray source, comprising:
a target for emitting X-rays upon being struck by the excitation beams from the source; and
one or more total internal reflection multilayer optic devices in direct physical contact with the target to transmit at least a portion of the X rays through total internal reflection to produce one or more X-ray beams, wherein the optic devices comprise an input face for receiving the X rays and an output face through which the X rays exit the integrated X-ray source.

22. The X-ray imaging system of claim 21, wherein the X-ray beams comprise fan-shaped beams, beams with circularly symmetric cross-sections, or beams with elliptical cross-sections.

* * * * *